US00RE39306E

(19) United States
(12) Reissued Patent
Konishi et al.

(10) Patent Number: US RE39,306 E
(45) Date of Reissued Patent: Sep. 26, 2006

(54) OPTICAL DISC DEVICE

(75) Inventors: Shinichi Konishi, Nara (JP); Takeshi Nakajima, Nara (JP); Harumitsu Miyashita, Osaka (JP); Toshihiko Takahashi, Osaka (JP); Toshiya Akagi, Osaka (JP); Yuji Hisakado, Osaka (JP); Yukihiro Yamasaki, Osaka (JP)

(73) Assignee: Matsushita Electric Industrial Co., Ltd., Osaka (JP)

(21) Appl. No.: 10/785,863

(22) Filed: Feb. 25, 2004

Related U.S. Patent Documents

Reissue of:
(64) Patent No.: 6,434,098
Issued: Aug. 13, 2002
Appl. No.: 09/840,874
Filed: Apr. 25, 2001

(30) Foreign Application Priority Data

Apr. 26, 2000 (JP) ..... 2000-125741

(51) Int. Cl.
*G11B 7/00* (2006.01)

(52) U.S. Cl. ..... 369/47.17; 369/47.35; 369/53.33; 369/124.14

(58) Field of Classification Search ..... 369/47.55, 369/53.34, 53.43, 47.17, 47.53, 53.33, 59.21, 369/124.14, 47.35; G11B 7/00
See application file for complete search history.

(56) References Cited

U.S. PATENT DOCUMENTS 4,866,691 A * 9/1989 Yokogawa ..... 369/47.35
5,684,772 A * 11/1997 Yamagami et al. ..... 369/47.27
6,104,682 A * 8/2000 Konishi
6,114,894 A * 9/2000 Choo ..... 327/362
6,195,319 B1 * 2/2001 Ohshita et al. ..... 369/44.35
6,259,300 B1 * 7/2001 Yasuda et al. ..... 327/333
6,291,962 B1 * 9/2001 Ogura et al. ..... 318/609
2000/1000083 * 4/2000 Shinichi

FOREIGN PATENT DOCUMENTS

JP 10-92111 * 4/1984

OTHER PUBLICATIONS

MAT (Machine assisted translation) of JP 2000–100083.*

* cited by examiner

*Primary Examiner*—Aristotelis M. Psitos
(74) *Attorney, Agent, or Firm*—Wenderoth, Lind & Ponack, L.L.P.

(57) ABSTRACT

An optical disc drive usable with discs to which data is continuously recorded and discs having a sector format can quickly resume playback signal output after passing imperfection causing potential reading errors, and plays disc with few read errors. A detection signal generator detects DC level fluctuation in the playback signal read from the disc and generates a detection signal tracking the DC level fluctuation. A selector selects a detection signal or a null signal without valid polarity based on the detection signal generated by the detection signal generator and input to the selector. A clamping unit performs a clamping process to suppress DC level fluctuation in the playback signal based on the detection signal when the selection unit selects the detection signal, and does not perform the clamping process when the selection unit selects the null signal. A signal processor performs specific signal processes based on clamping unit output.

14 Claims, 10 Drawing Sheets

1 OPTICAL DISC
2 OPTICAL PICKUP
PREAMPLIFIER
3
RF
TE
CLAMPING UNIT
4
AMPLITUDE FLUCTUATION DETECTOR
14
WOBBLE DROPOUT DETECTOR
16
WOBBLE DIGITIZER
19
SELECTOR
18
FIRST DETECTION SIGNAL DELAY
15
SECOND DETECTION SIGNAL DELAY
17
AGC CIRCUIT
5
EQUALIZER
6
7 DIFFERENTIAL AMPLIFIER
A/D CONVERTER
8
D/A CONVERTER
10
OFFSET CONTROL CIRCUIT
9
SIGNAL PROCESSOR
11
PLL CIRCUIT
12
CONTROLLER
13
30
32
2
100

(j) RF SIGNAL
(y) DIGITAL VOLTAGE GENERATOR OUTPUT SIGNAL
(z) SECOND DIFFERENTIAL AMPLIFIER OUTPUT SIGNAL
(m) INPUT SIGNAL TO A/D CONVERTER
D
Vrt
Vrb

OPTICAL DISC DEVICE

Matter enclosed in heavy brackets [ ] appears in the original patent but forms no part of this reissue specification; matter printed in italics indicates the additions made by reissue.

*This application is a reissue application of U.S. Pat. No. 6,434,098, issued Aug. 13, 2002.*

BACKGROUND OF THE INVENTION

1. Field of the Invention

The present invention relates generally to an optical disc drive for reproducing content from either continuously recorded media or sector format media, and relates more specifically to an optical disc device for reading content with few errors from an optical disc having black dots, scratches, or other imperfections causing read errors.

It should be noted that Japanese Patent Application 11-207601 and U.S. Pat. No. 6,104,682 relating to the present invention are incorporated herein by way of reference in their entirety.

2. Description of Related Art

Discs, such as DVD-ROM discs, that record data continuously, and discs, such as DVD-RAM discs, having a sector format and recording data by sector, are both commonly used today. Signals are generally recorded to continuous-recording disc media so that the playback signal is DC-free. "DC-free" represents the average signal level of the playback signal obtained from the pattern recorded to the medium being always constant within a certain data length (such as one byte).

A digital sum value (hereinafter referred to as DSV) can be used to evaluate DC-free performance. The DSV is the sum of signs within a specific data period where positive (+) polarity is assigned to the mark side, and negative (−) polarity is assigned to the gap (that is, the unrecorded part between marks) side of the playback wave obtained from the recorded signal pattern. If a signal is completely DC-free, the DSV will be 0, and if the DSV of a particular byte is 0, the byte is considered to be DC-free.

By recording continuously recorded data so that the playback signal is generally DC-free, it is not necessary to consider DC level fluctuation when the playback signal is processed after analog-to-digital (hereinafter referred to as A/D) conversion. A conventional optical disc drive thus only needs to control the DC level of the input signal to the A/D converter so that the DSV of the A/D converted signal is 0.

When the playback signal is obtained from sector format media such as DVD-RAM discs, however, there is a sharp change in the DC level between the playback signal from the prepit address area of the disc and the playback signal from the data content storage area of the disc. There is also no assurance that signals are recorded in all areas because recorded sectors and blank sectors are intermixed.

Conventional disc drives control the DC level of the input signal to the A/D converter so that the DSV of the signal after AND conversion is 0.

DC level convergence where the DC level changes greatly and abruptly at the change between the prepit address area and the content recording area is, however, time consuming.

The gain crossover point can be raised to speed this convergence, but this technique adds noise to the data after AID conversion. Another method of reducing the effects of DC level fluctuation is to first pass the signal through a high-pass filter before A/D conversion. However, when an area where there is a scratch or black dot or other imperfection on the disc is reproduced, the signal level changes greatly after passing the scratch or black dot, for example, and may exceed the tolerance range of the A/D converter. Recovering the playback signal in such cases takes time.

SUMMARY OF THE INVENTION

The present invention was conceived with consideration for the above noted problems, and an object of this invention is to provide an optical disc apparatus that can be used with both DVD-ROM and other disc media to which data is continuously recorded and DVD-RAM and other sector format disc media, enables fast recovery of the playback signal after passing a scratch, black dot, or other imperfection on the disc, and as a result can reproduce signals with few errors.

An optical disc apparatus according to this invention achieves the above objects by means of a detection signal generator for detecting a DC level change in a playback signal read from an optical disc, and generating a detection signal that tracks this DC level change; a selector for selecting the detection signal or a null signal without valid polarity; a clamping unit for performing a clamping process to suppress DC level change in the playback signal based on the detection signal when the selector selects the detection signal, and not performing the clamping process when the selector selects the null signal; and a signal processor for performing a specific signal process based on clamping unit output.

A further aspect of an optical disc apparatus according to this invention achieves the above objects by means of a digitizer for applying a specific signal process to a playback signal read from an optical disc to digitize and output the playback signal; a digital voltage generator forming a feedback loop with the digitizer so that the duty ratio of the two-value output from the digitizer is a specific value; a differential amplifier for outputting the difference between the playback signal and digital voltage generator output; and a signal processor for performing a specific signal process based on differential amplifier output.

It is an advantage of the invention that signal reading can be resumed immediately after passing a black dot or other obstacle, and the optical disc apparatus read performance can therefore be improved.

BRIEF DESCRIPTION OF THE DRAWINGS

Other objects and attainments together with a fuller understanding of the invention will become apparent and appreciated by referring to the following description and claims taken in conjunction with the accompanying drawings, in which:

DETAILED DESCRIPTION OF THE PREFERRED EMBODIMENTS

An optical disc apparatus according to the present invention is described below with reference to the accompanying figures. It should be noted that while the invention is described using by way of example reproducing an optical disc with a sector format in which the recording guide groove wobbles with a specific period, this invention can also be used to playback continuously recorded content such as from a compact disc (CD) or DVD-ROM medium.

EMBODIMENT 1

Figure 1:
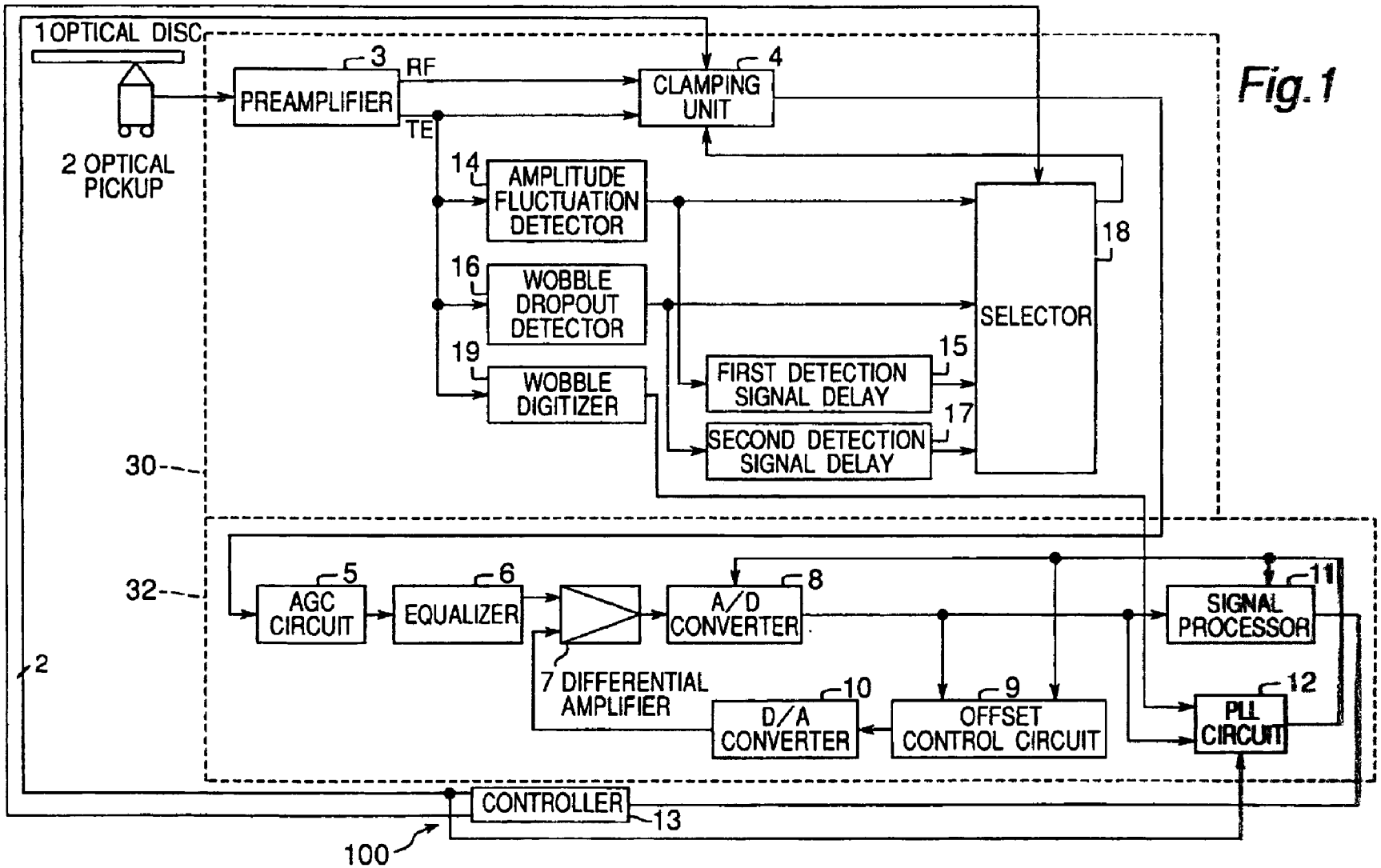
FIG. 1 is a diagram of the configuration of the playback mechanism of an optical disc apparatus according to a first embodiment of the present invention.
Figure 2:
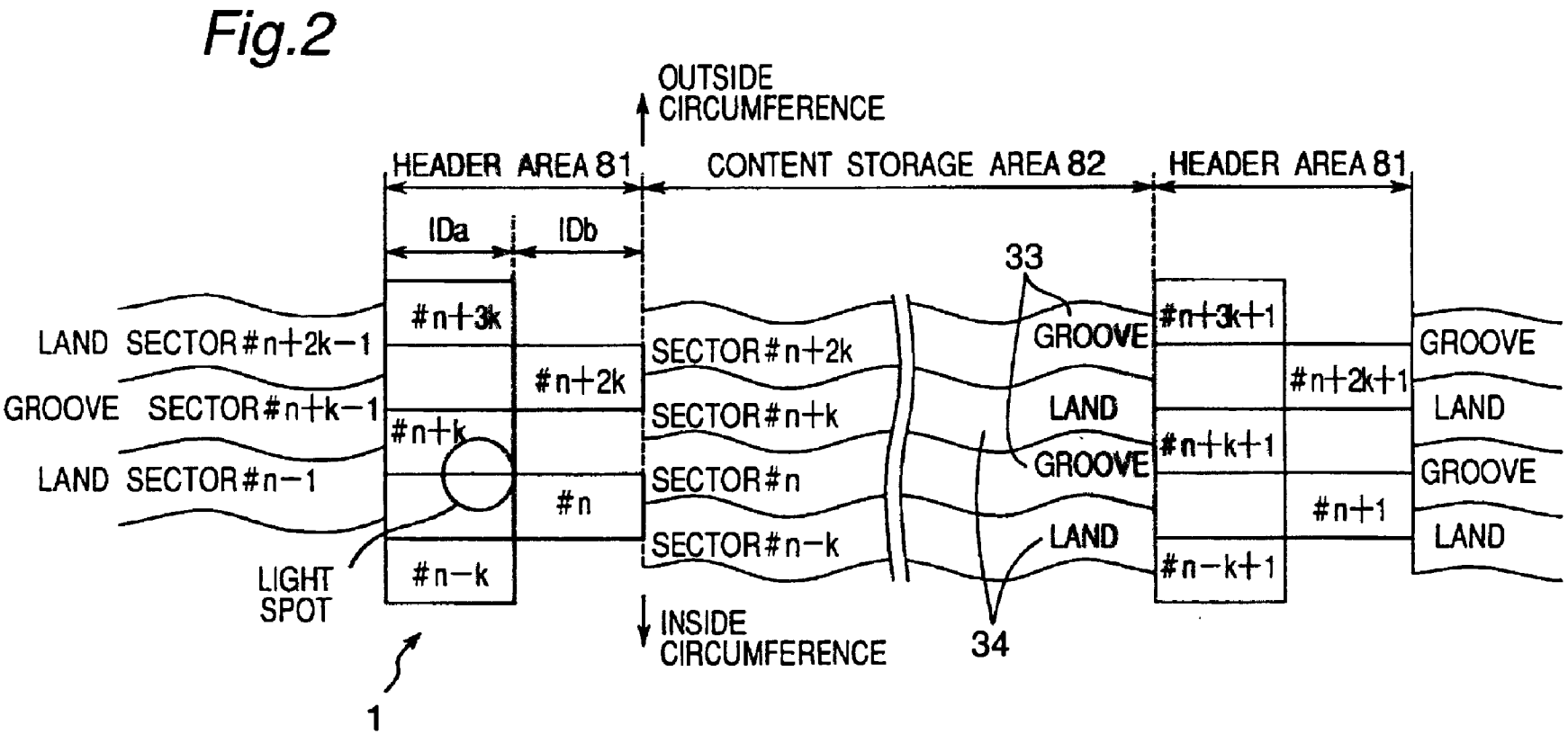
FIG. 2 a diagram of the data structure of an optical disc.

FIG. 1 is a block diagram showing the playback mechanism of an optical disc apparatus 100 according to a first preferred embodiment of this invention. Optical disc apparatus 100 reads the content recorded to optical disc 1, and reproduces the text, video, and audio contained in the recorded content. Optical disc 1 is a circular disc with a sector format and a periodically wobbling recording guide groove. This sector format is shown in FIG. 2 and further described below. It should be noted that optical disc 1 itself is not a part of optical disc apparatus 100, but optical disc apparatus 100 in conjunction with optical disc 1 may be referred to as an optical disc system.

Optical disc apparatus 100 has optical pickup 2, signal output unit 30, signal processing unit 32, and controller 13. Optical pickup 2 emits a light beam to the optical disc 1, reads the recorded data based on the varying intensity of the reflected light beam, and outputs an electrical signal. Signal output unit 30 outputs a playback signal from the electrical pick-up signal output by optical pickup 2. Signal processing unit 32 applies a specific signal process to the playback signal output by signal output unit 30, and outputs the result. Controller 13 references the output from signal processing unit 32 to control the operation of signal output unit 30, and more specifically to control operation of selector 18 and clamping unit 4 of signal output unit 30.

Signal output unit 30 is described in further detail below. Signal output unit 30 has a preamplifier 3, clamping unit 4, amplitude fluctuation detector 14, wobble dropout detector 16, first detection signal delay 15, second detection signal delay 17, selector 18, and wobble digitizer 19. Preamplifier 3 amplifies the output signal from optical pickup 2, and outputs a wide band tracking error signal (hereinafter referred to as TE signal) and RF signal. How these signals are generated is described below.

Clamping unit 4 time-division switches RF signal and TE signal input from preamplifier 3. Clamping unit 4 then time-division clamps the DC change in the switched signal to cancel DC fluctuation. This operation is accomplished according to the read gate signal from controller 13 as further described below and selector 18. Note that "clamp" generally means to bias a particular part of a waveform to maintain that part of the waveform at a constant level.

Amplitude fluctuation detector 14 of signal output unit 30 then detects variation in the amplitude of the RF signal output by preamplifier 3. Wobble dropout detector 16 removes unnecessary frequency components from the TE signal output from preamplifier 3. Wobble dropout detector 16 extracts a periodic sine wave (hereinafter referred to as wobble signal) corresponding to the periodically wobbling recording guide groove (see FIG. 2) of the disc, and detects wobble signal dropout. Based on a control signal from controller 13, selector 18 selects and outputs a signal from amplitude fluctuation detector 14, first detection signal delay 15, wobble dropout detector 16, or second detection signal delay 17, or outputs a null signal if no signal is selected. Selector 18 outputs to clamping unit 4. First detection signal delay 15 and second detection signal delay 17 delay the output signals from amplitude fluctuation detector 14 and wobble dropout detector 16. These signals are delayed while the signal is high level, thus extending the high level period of each signal. Wobble digitizer 19 applies a specific process to digitize the wobble signal.

Signal processing unit 32 includes auto-gain control (AGC) circuit 5, equalizer 6, differential amplifier 7, analog-to-digital converter 8, offset control circuit 9, D/A converter 10, signal processor 11, and phase locked loop (PLL) circuit 12. AGC circuit 5 controls gain so that the amplitude of the output signal from clamping unit 4 remains constant. Equalizer 6 improves the frequency characteristic of the output signal from AGC circuit 5. Differential amplifier 7 outputs the difference signal of equalizer 6 output signal minus the feedback voltage from D/A converter 10. AID converter 8 converts the analog output signal from differential amplifier 7 to a digital signal. Offset control circuit 9 extracts the DC component of the output signal from A/D converter 8. D/A converter 10 converts the digital output signal from offset control circuit 9 to an analog voltage. Signal processor 11 processes the output signal from A/D converter 8. PLL circuit 12 applies frequency control based on the output signal from the wobble digitizer 19, further described below, applies phase control using the output signal from A/D converter 8, and generates a clock synchronized to the A/D converter signal.

As shown in FIG. 1, differential amplifier 7, A/D converter 8, offset control circuit 9, and D/A converter 10 form an "offset control loop." Providing an offset control loop makes it possible to control the center of DC level fluctuation in the signal input to A/D converter 8 to approximately the center of the range of voltage levels (hereinafter referred to as "conversion level") that can be converted by AND converter 8. The value of the conversation level center point output by A/D converter 8 after analog-to-digital conversion has a value of 0, where voltage values below this center point are output as negative values, and voltage values above this center point are output as positive values.

A process whereby preamplifier 3 of signal output unit 30 outputs the TE signal and RF signal is described below. Preamplifier 3 contains a focus detector (not shown in the figure) having four sensors (sensors A, B, C, D). The signal read beam emitted from the optical pickup 2 is reflected from optical disc 1 and incident to the focus detector. The focus detector detects the signal read beam using the four sensors A to D. An RF signal can therefore be obtained by adding all outputs from focus detector sensors A to D.

The section shape of the reflected light is a regular circle when the light beam is focused on a pit, and is elliptical when not focused on a pit. Each of the four focus detector sensors output the same detection signal when the reflected beam is circular, and output different detection signals when the reflected beam is elliptical. Assuming that sensors A and B detect the reflected light lopsided toward the inside circumference of the track and sensors C and D detect the reflected light lopsided toward the outside circumference of the track. The output signal of sensor A is denoted as "A", and the like, and a TE signal can obtained by (A+B)−(C+D).

The format of an optical disc 1 to which the data that is reproduced by optical disc apparatus 100 according to this preferred embodiment of the invention is described next below. FIG. 2 is a schematic diagram showing the data format of a circular optical disc 1 such as a DVD-RAM disc. Optical disc 1 is broadly divided between a header area 81 for storing address information, and a content storage area 82 to which is recorded the video, audio, and other content that a user will want to reproduce.

Grooves 33 and lands 34 are alternately disposed in the content storage area 82. Address information in header area 81 is divided into streams IDa and IDb, which are disposed with one offset ½ track pitch to the inside or outside circumference side of the other. The pit signal width in this header area 81 is controlled to substantially the same width as the grooves 33 and lands 34 in the content storage area 82.

It will be noted that while plural sectors appear to be present only in content storage area 82, each defined sector includes a header area 81 part and a content storage area 82 part. That is, header area 81 is part of a sector.

As will be known from FIG. 2, grooves 33 and lands 34 wobble in a sine wave pattern orthogonally to the track trace. An advantage of this is that recording time can be shortened by detecting the period of this sine wave wobble signal, generating a clock synchronized to the detection signal, and writing data synchronized to this clock. This is because wobble appears substantially continuously in one rotation of grooves 33 and lands 34, and a wobble PLL circuit for generating recording clocks (not shown) can therefore quickly lock onto the phase.

The operation of a optical disc apparatus 100 (FIG. 1) for reproducing content from optical disc 1 is described next below with reference to FIG. 3.

Figure 3:
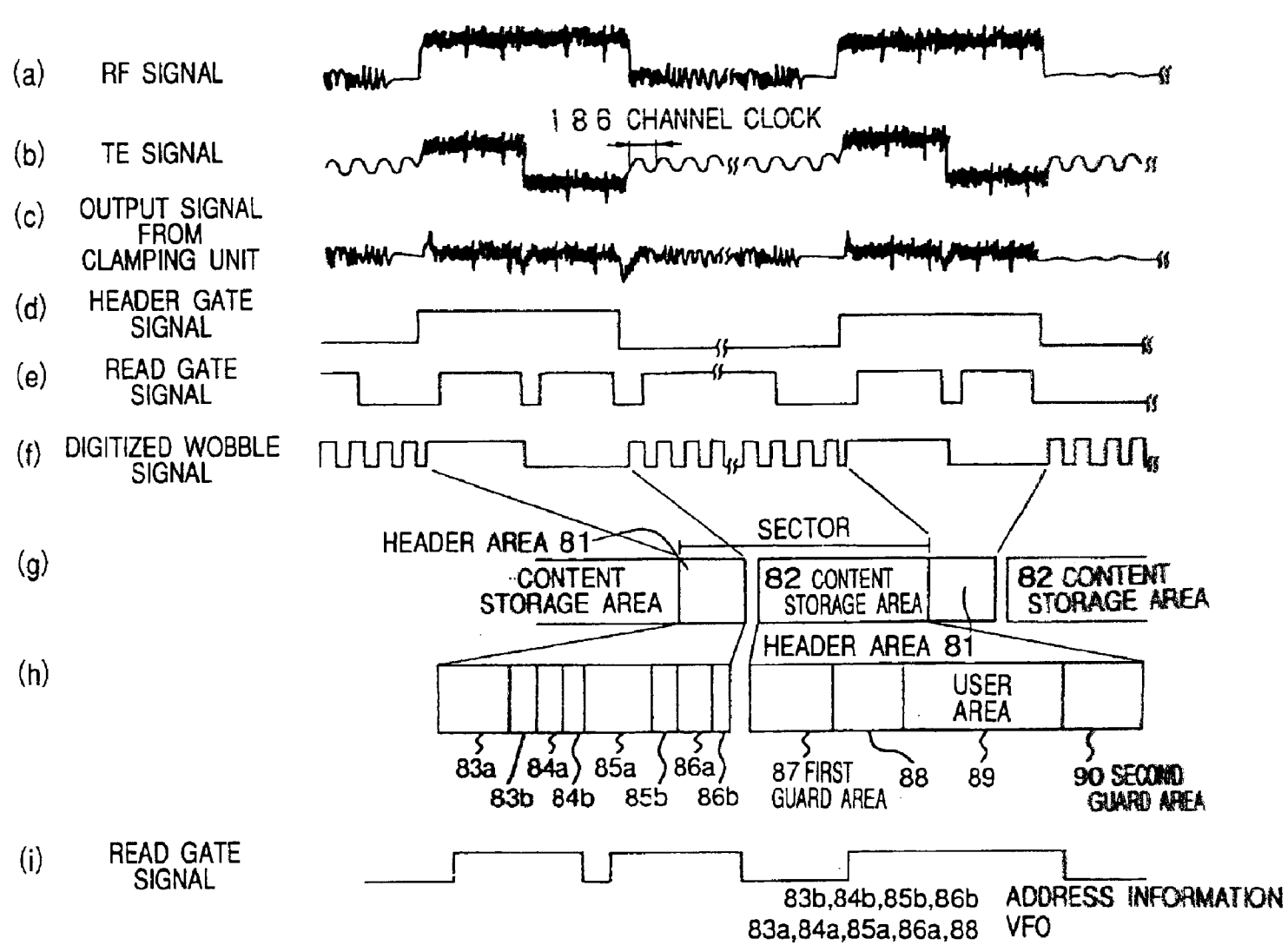
FIG. 3 is a timing chart for describing the operation of the optical disc apparatus shown in FIG. 1, and the corresponding sector format of the optical disc.

FIG. 3 is a timing chart used to describe the operation of optical disc apparatus 100 (FIG. 1), and the corresponding sector format. The following example further assumes that data is read from a DVD-RAM disc. Row (g) in FIG. 3 corresponds to the data structure in FIG. 2. The prepits formed in header area 81 are broadly grouped as VFO parts 83a, 84a, 85a, and 86a recording a single frequency pattern, and address ID parts 83b, 84b, 85b, and 86b recording address information.

Content storage area 82 is readable and writable, and data may or may not be recorded to content storage area 82. When data is recorded, content storage area 82 contains a first guard area 87, VFO 88, the recorded content (user data) 89, and second guard area 90. Content storage area 82 has a periodically wobbling format with the wobble period being the 186 channel clock period as shown in FIG. 3 Therefore, regardless of whether data is recorded to the content storage area 82, the TE signal contains both the prepit signal corresponding to the header area 81 as shown in (b) in FIG. 3, and a wobbling sine wave signal having a period of 186 channel clocks.

As shown in (h) in FIG. 3, header area 81, identified by IDa in FIG. 2, contains VFO 83a, address ID 83b, VFO 84a, and address ID 84b. Header area 81 likewise contains VFO 85a, address ID 85b, VFO 86a, and address ID 86b.

A normal reproduction operation is described first below with reference to FIG. 1.

The read signal from optical disc 1 generated by optical pickup 2 is input to preamplifier 3. Preamplifier 3 outputs an RF signal ((a) in FIG. 3) and TE signal ((b) in FIG. 3). As shown in the Figure, these signals have a high level (=1) signal level when header area 81 is read. This is because header area 81 is manufactured with high reflectivity. The RF signal is input to clamping unit 4 and amplitude fluctuation detector 14. The TE signal is input to clamping unit 4, wobble dropout detector 16, and wobble digitizer 19.

Figure 4:
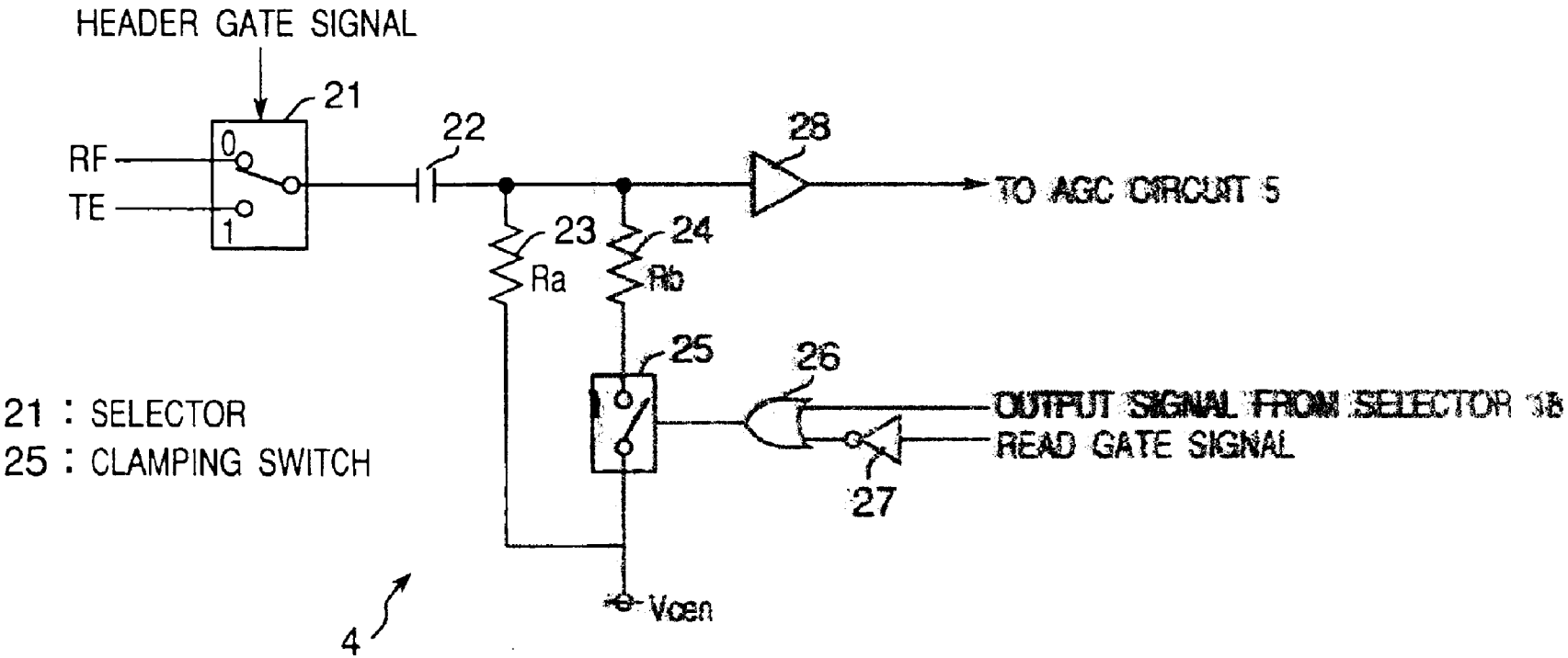
FIG. 4 is a circuit diagram of the configuration of the clamping unit.

The RF signal, TE signal, header gate signal ((d) in FIG. 3), read gate signal ((e) in FIG. 3), and selector 18 output signal are input to clamping unit 4. FIG. 4 is a circuit diagram showing the configuration of clamping unit 4. Clamping unit 4 contains selector 21, capacitor 22, resistors Ra 23 and Rb 24, clamping switch 25, OR gate 26, inverter 27, and buffer 28. Selector 21 time division switches between the RF signal and TE signal based on the header gate signal from controller 13 (FIG. 1). Capacitor 22 cuts the DC component of the output signal from selector 21. Resistors Ra 23 and Rb 24 apply a desired DC potential to the output signal from capacitor 22. Note that Rb is sufficiently low compared to Ra. For example, Rb≈Ra/10. Capacitor 22 and resistor Ra 23 or resistor Rb 24 form a bypass filter.

Clamping switch 25 closes when a high level (=1) input signal is applied. Resistor Rb shorts to a specific potential Vcen when clamping switch 25 closes. This time-division reduces the time constant determined by capacitor 22 and resistor Ra 23 or resistor Rb 24, enabling DC fluctuation to be quickly suppressed. OR gate 26 and inverter 27 are a logic circuit for aligning the polarity of and merging the output signal from selector 18 (FIG. 1) and the control signal from controller 13 (FIG. 1). More specifically, OR gate 26 outputs a 1 when the output signal from selector 18 (FIG. 1) is 1 or the read gate signal is 0. Buffer 28 buffers the clamped signal.

The operation of a clamping unit 4 thus comprised is described next below. Selector 21 selects the TE signal when the header gate signal ((d) in FIG. 3) is high level (=1), and selects the RF signal when the header gate signal is low level (=0). The header gate signal goes high level (=1) when optical disc apparatus 100 (FIG. 1) reproduces the header area 81 of the disc.

It is important to note here that when the header gate signal is high level (=1), there is no sharp DC fluctuation in the output signal from clamping unit 4 ((c) in FIG. 3) even if there is sharp DC fluctuation in the TE signal ((b) in FIG. 3). This is because DC fluctuation causes the read gate signal ((e) in FIG. 3) to go low level (=0) and clamping switch 25 therefore closes. More specifically, as a result of clamping switch 25 closing and resistance Rb 24 shorting to voltage Vcen, the time constant determined by the sufficiently low resistance Rb 24 and capacitor 22 is small, and DC fluctuation is quickly suppressed.

The read gate signal ((e) in FIG. 3) goes between the high level and low level three times in one sector. That is, the read gate signal rises slightly delayed from the start of VFO 83a and 85a, falls at the end of address information 84b and 86b, rises slightly delayed from the beginning of VFO 88, and falls in second guard area 90. Note that approximately the center of the amplitude variation of output signal from clamping unit 4 shown in (c) in FIG. 3 is matched to voltage Vcen.

Referring again to FIG. 1, wobble digitizer 19 outputs a binary wobble signal ((f) in FIG. 3) to PLL circuit 12. PLL circuit 12 controls frequency by counting and comparing the period of this binary wobble signal with its own clock. As shown in FIG. 1, PLL circuit 12 also receives the read gate signal from controller 13 and performs feedback control so as to synchronize with a predetermined reference phase. When the feedback signal synchronizes with the reference phase, PLL circuit 12 locks the phase of the feedback signal. An RF signal output from A/D converter 8 and sampled at the output clock of PLL circuit 12 is input to PLL circuit 12. When the frequency enters the capture range as a result of the above-noted frequency control, PLL circuit 12 applies phase control and sets the zero cross point sample value to zero. PLL circuit 12 also generates and supplies to other components a clock synchronized to the RF signal. Signal processor 11 applies Viterbi decoding, demodulation, or other process, and outputs address information and user data to controller 13 and other downstream circuits (not shown in the Figure).

A method whereby A/D converter 8 cancels input signal offset is described next. A/D converter 8 outputs an A/D converted signal to offset control circuit 9. Offset control circuit 9 counts each sign change in the polarity signal (MSB) of this digital signal at the channel clock. More specifically, offset control circuit 9 increments the count at each positive sign and decrements the count at each negative sign. The offset control circuit 9 repeats these addition and subtraction operations and outputs an integrated signal to the D/A converter 10 of the offset control loop. D/A converter 10 converts the input binary integral to an analog voltage, and outputs the analog voltage to differential amplifier 7. Differential amplifier 7 subtracts the analog voltage input from D/A converter 10 from the output signal from equalizer 6, and outputs to A/D converter 8. This operation makes it possible to cancel the offset voltage generated by the precedent analog circuits with the analog input to the A/D converter 8, and thus enables the dynamic range of AID converter 8 to be used effectively.

Figure 5:
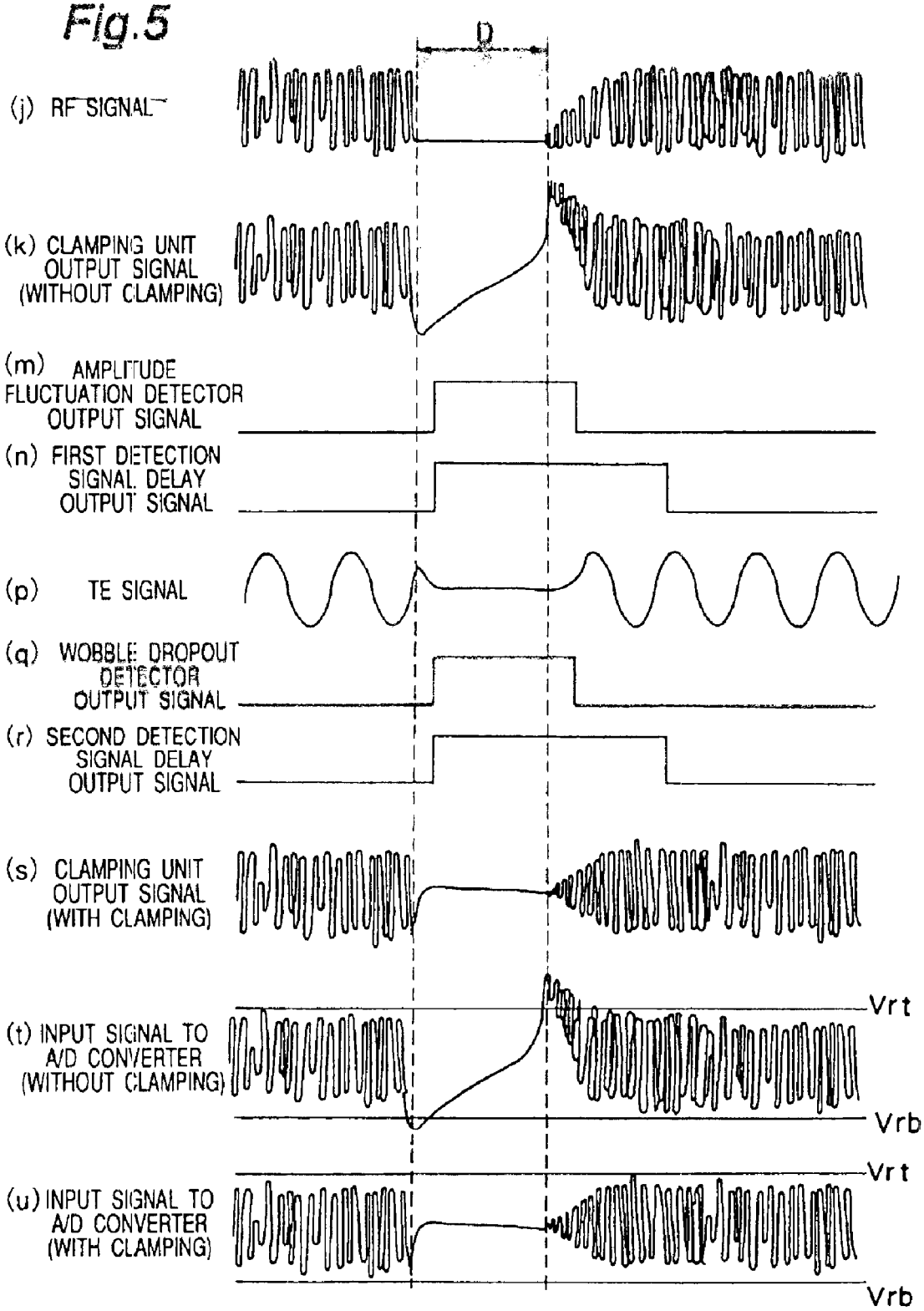
FIG. 5 is the operating timing chart of primarily the clamping unit.

Operation when a sector is read from a DVD-RAM disc having a black dot thereon is described next with reference to FIG. 5. FIG. 5 shows the timing of primarily clamping unit 4 (FIG. 1) operation.

Rows (j) and (p) in FIG. 5 show the RF signal and TE signal output by preamplifier 3 when a sector having a black dot is read. Row (k) shows the output signal from clamping unit 4 (FIG. 1) when clamping using the control signal from selector 18 (FIG. 1) is not applied. Row (m) shows the output signal from amplitude fluctuation detector 14 (FIG. 1), row (n) shows the output signal from first detection signal delay 15, row (q) shows the output signal from wobble dropout detector 16, row (r) shows the output signal from second detection signal delay 17, and row (s) shows the output signal from clamping unit 4 when clamping using the control signal from selector 18 (FIG. 1) is applied. Row (t) shows the input signal to A/D converter 8 when clamping using the control signal from selector 18 is not applied, and row (u) shows the input signal to A/D converter 8 when clamping using the control signal from selector 18 is applied. It will be known from rows (m), (n), (q), and (r) in FIG. 5 that amplitude fluctuation detector 14 (FIG. 1), first detection signal delay 15 (FIG. 1), wobble dropout detector 16 (FIG. 1), and second detection signal delay 17 (FIG. 1) detect DC level fluctuation in the playback signal from the optical disc, and generate a detection signal that tracks this fluctuation.

When the sector containing period D where the black dot is present is read, light is not reflected only where the black dot is present, and the RF signal level thus swings to the low side (dark reflection) ((j) in FIG. 5). The TE signal also drops where the black dot is present ((p) in FIG. 5). Clamping unit 4 is a high pass filter with a large time constant relative to the sector length in the steady state, and the output signal at this time is a differentiated signal as shown in (k) in FIG. 5.

Amplitude fluctuation detector 14 detects the upper envelope, which is the output when the RF signal reflection is bright, and slices the envelope signal at a fixed level. Parts lower than the slice level are output as a "1", and higher parts are output as a "0" ((m) in FIG. 5). This means that output goes high level (=1) when the black dot is read, and then goes low level (=0) after the black dot is passed. Wobble dropout detector 16 full-wave rectifies the TE signal. That is, wobble dropout detector 16 inverts signals below a specific reference level to a signal level above this reference level to generate a fullwave rectified signal. Wobble dropout detector 16 slices this full-wave rectified signal at a fixed level, and outputs parts below the slice level high level (=1) and parts above the slice level low level (=0) ((q) in FIG. 5). As with output from amplitude fluctuation detector 14, output goes to the high level (=1) when the black dot is read, and then goes to the low level (=0) after passing the black dot.

First detection signal delay 15 extends the high level (=1) period of the output signal ((m) in FIG. 5) from amplitude fluctuation detector 14 to output an extended high level (=1) period signal as shown in (n) in FIG. 5. Second detection signal delay 17 likewise extends the high level (=1) period of the output signal from wobble dropout detector 16 ((q) in FIG. 5) to output an extended high level (=1) period signal as shown in (r) in FIG. 5.

When clamping using the output signal from selector 18 is not applied, the input signal to AND converter 8 contains DC fluctuation resulting from differentiation by the black dot ((t) in FIG. 5). This input signal is based on the output signal ((k) in FIG. 5) from clamping unit 4. The two lines Vrt and Vrb shown in (t) in FIG. 5 are the A/D conversion reference levels of A/D converter 8. When signal clamping as described above is not applied, fluctuation due to differentiation is great and exceeds the reference level immediately after passing the black dot. Output after A/D conversion where the reference level is exceeded is highest, and signals in this part cannot be read.

This fluctuation due to differentiation can be reduced by increasing the time constant determined by the capacitor 22 (FIG. 4) and resistor Ra 23 (FIG. 4) of clamping unit 4. However, when there is always a DC level difference between header area 81 and content storage area 82, such as with the format of a DVD-RAM disc, reproduction must track the DC level change at the beginning of VFO 83a, 85a, and 88 ((h) in FIG. 3), and a large time constant cannot be used.

Figure 6:
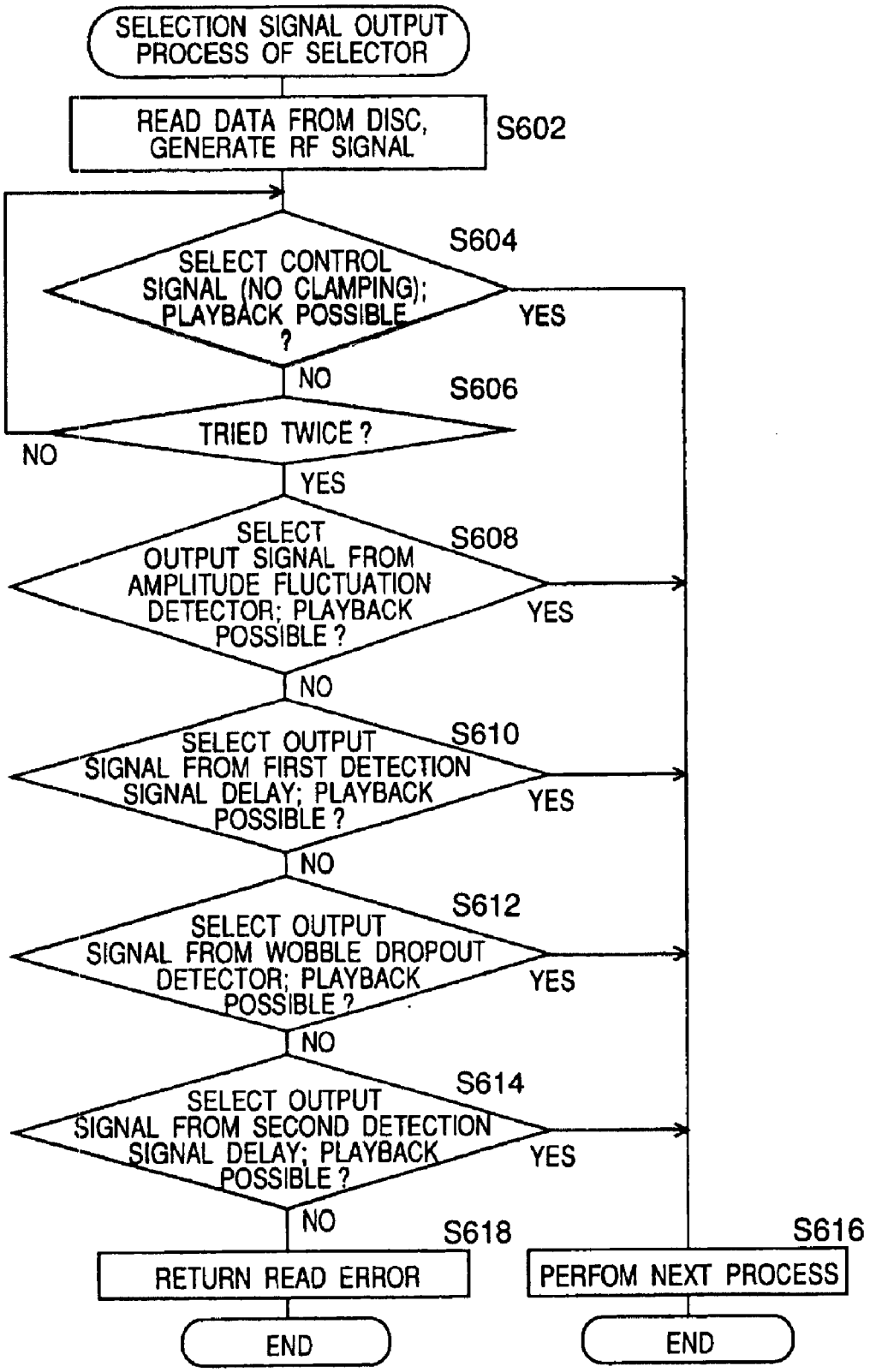
FIG. 6 is a flow chart of the selection output process of the selector.

Controller 13 therefore operates selector 18 as described below with reference to the flow chart in FIG. 6 showing the process for outputting a selection signal from selector 18. This process is controlled by instructions from controller 13.

When a read error occurs, controller 13 (FIG. 1) controls selecting a total of five signal types, that is four types of signals and a null signal, sequentially or according to whether reproduction is possible. Control is based on control signals generated by controller 13. This makes it possible to improve the read performances of optical disc apparatus 100 (FIG. 1).

First, data is read from optical disc 1 (FIG. 1) to generate an RF signal (step S602). This RF signal is shown in (j) in FIG. 5. When the RF signal is obtained, controller 13 (FIG. 1) instructs selector 18 (FIG. 1) to select a low level signal and determines whether reproduction (reading) is possible using that RF signal (step S604). This low level signal is a null signal without valid polarity, and means that clamping is not applied. Null signal selection is possible because there are cases, such as when fine amplitude variation continues for an extended time due to, such as, fingerprints, when reading is easier if clamping is not applied even though amplitude variation is detected. If the null signal is selected, the waveform of the output signal from clamping unit 4 (FIG. 1) is as shown in (k) in FIG. 5. When a signal such as this is output from clamping unit 4 (FIG. 1) and as a result, reproduction is possible, control skips to the subsequent signal processing operation (step S616) of the signal processor 11 (FIG. 1).

However, as previously described with reference to (t) in FIG. 5, if the output signal from clamping unit 4 is input to A/D converter 8 and this input signal exceeds the reference level of A/D converter 8, that part of the signal above the reference level cannot be reproduced. In this case, the same selection signal (that is, a null signal) is output again (step S606). This is because the first reproduction attempt may simply fail accidentally.

If reproduction is attempted a second time and again fails, controller 13 (FIG. 1) selects and inputs to clamping unit 4 the output signal ((m) in FIG. 5) from amplitude fluctuation detector 14, which detected amplitude fluctuation, to determine whether playback is possible (step S608). The output signal from amplitude fluctuation detector 14 is input to clamping switch 25 (FIG. 4) by way of inverter 27 and OR gate 26 (FIG. 4). Only when this signal is high level (=1) is resistance Rb 24 (FIG. 4) shorted to the desired potential and the time constant determined by the capacitor and resistance reduced. As a result, DC reproduction is rapidly accomplished, and DC fluctuation immediately after passing the black dot is suppressed as shown in (s) in FIG. 5. This signal is then passed through AGC circuit 5 (FIG. 1) and equalizer 6 (FIG. 1), and input to A/D converter 8 (FIG. 1) as the signal shown in (u) in FIG. 5.

The content can be reproduced using a signal as shown in (u) in FIG. 5 (step S608 returns yes), and the subsequent signal processing operation can be performed (step S616). As will be understood from (u) in FIG. 5, signal input after passing the black dot does not exceed the reference level, and signal reading and playback can therefore be resumed immediately after passing the black dot.

If reproduction is not possible even though the output signal of amplitude fluctuation detector 14 is clamped (step S608 returns no), the output signal ((n) in FIG. 5) of first detection signal delay 15 is selected and input to clamping unit 4 to determine whether playback is possible (step S610).

The meaning of stretching the detection signal from amplitude fluctuation detector 14 is described next below. There can be various types of impediments to reading on optical disc 1, including scratches and black dots. After passing a reading impediment such as noted herein, the output signal from amplitude fluctuation detector 14 or the output signal from wobble dropout detector 16 does not necessarily fall even after the playback signal is restored. If the playback signal tends to the dark side, the level may drop too soon. However, because the extended signal reliably drops after a specific period, signal clamping can be accomplished as desired.

If playback is not possible when the output signal ((n) in FIG. 5) from first detection signal delay 15 (FIG. 1) is selected (step S610 returns no), the output signal ((q) in FIG. 5) from wobble dropout detector 16 (FIG. 1) is selected and input to clamping unit 4, and whether playback is possible is again determined (step S612). If playback is still not possible, the output signal ((r) in FIG. 5) from second detection signal delay 17 (FIG. 1) is selected last. If playback is not possible regardless of which signal is selected, controller 13 (FIG. 1) detects a read error (playback error) (step S618) and the read process ends.

A first embodiment of this invention is described above. In this first embodiment selector 21 (FIG. 4) selects the TE signal when the header gate signal is high level (=1). It will be obvious, however, that selection shall not be limited to the TE signal and it is also possible to select the RF signal. For example, the TE signal in header area 81 and the RF signal in content storage area 82 are used with a 2.6 GB capacity DVD-RAM disc, while the RF signal in both header area 81 and content storage area 82 is used with a 4.7 GB capacity DVD-RAM disc.

Furthermore, two different types of detection sections, that is, amplitude fluctuation detector 14 and wobble dropout detector 16, are disposed in this preferred embodiment. It is, however, possible to use either one of these to reproduce media, such as DVD-RAM discs, containing a wobble signal. Amplitude fluctuation detector 14 is, however, required to play media not containing a wobble signal, such as DVD-ROM discs.

It will also be noted that while an offset loop is used in this preferred embodiment of the invention, an offset loop is not necessarily required.

EMBODIMENT 2

Figure 7:
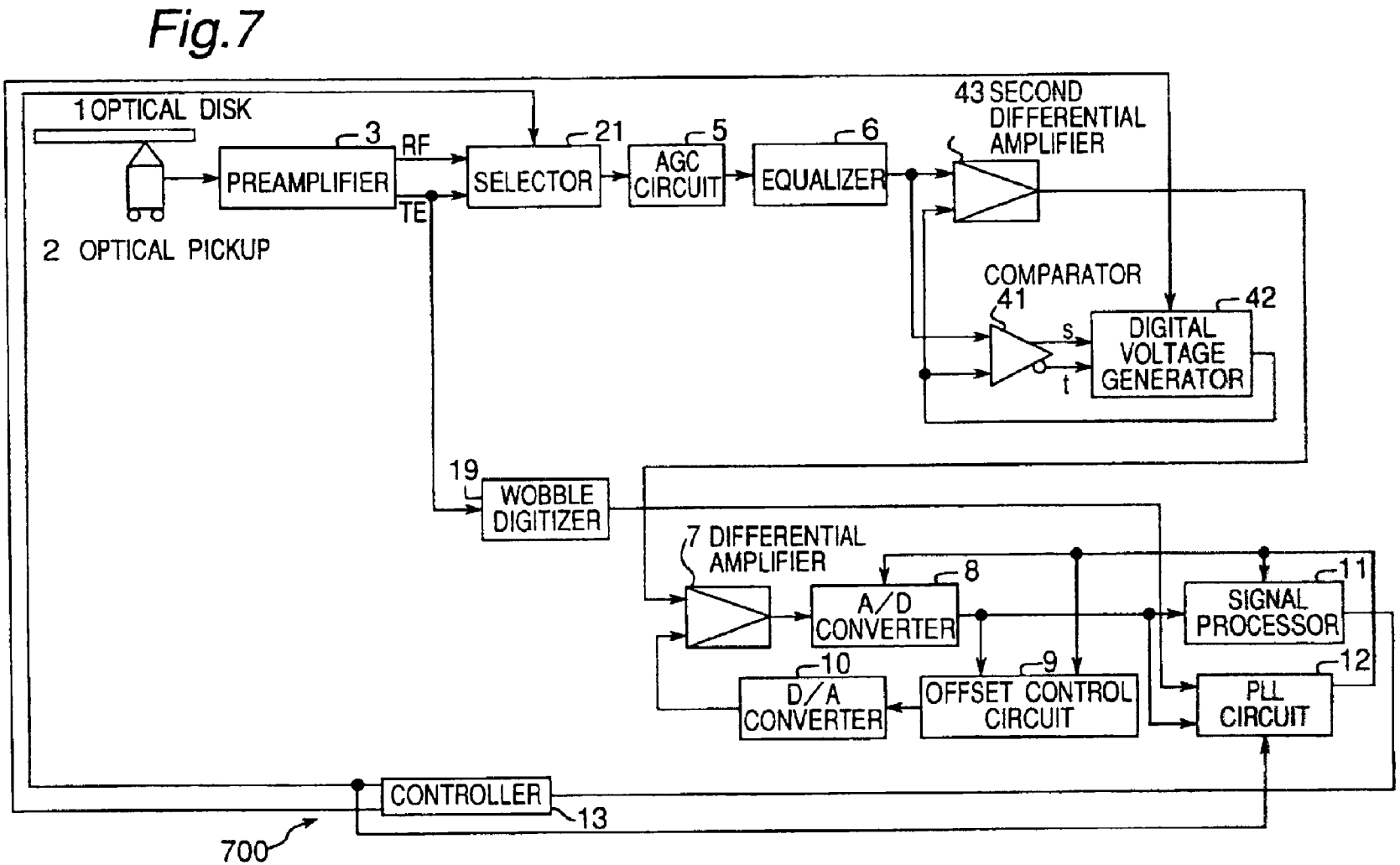
FIG. 7 is a diagram of the configuration of the playback mechanism of an optical disc apparatus according to a first embodiment of the present invention.

FIG. 7 is a block diagram showing the playback mechanism of an optical disc apparatus 700 according to a second embodiment of this invention. Like parts in this and the first embodiment shown in FIG. 1 are identified by like reference numeral, and further description thereof is omitted below.

Optical disc apparatus 700 according to this second embodiment differs from the optical disc apparatus 100 (FIG. 1) of the first embodiment in that (1) clamping unit 4 (FIG. 1) comprises only selector 21; (2) amplitude fluctuation detector 14, first detection signal delay 15, wobble dropout detector 16, second detection signal delay 17, and selector 18 are eliminated; and (3) comparator 41, digital voltage generator 42, and second differential amplifier 43 are disposed between equalizer 6 and differential amplifier 7.

The functions of the new elements noted in (3) above are described below. Output signal from equalizer 6 and the digital voltage signal from digital voltage generator 42 are input to comparator 41 and second differential amplifier 43. Comparator 41 compares the output signal from equalizer 6 and the output signal from digital voltage generator 42. If the output signal from equalizer 6 is greater, comparator output signal s goes to the high level (=1), and otherwise goes to the low level (=0). Comparator 41 also outputs the inversion t of output signal s. Both output signals s and t are input to digital voltage generator 42. Digital voltage generator 42 is provided to maintain the duty ratio between 1s and 0s in the comparator 41 output signals to a specific value (such as 1 in this example) based on the read gate signal from controller 13. More specifically, digital voltage generator 42 outputs the difference between output signal s and inverse signal t from comparator 41. The output signal from digital voltage generator 42 is input to second differential amplifier 43 and as feedback to the comparator 41. Second differential amplifier 43 outputs the difference of the digital voltage output signal from digital voltage generator 42 subtracted from the output signal from equalizer 6.

Figure 8:
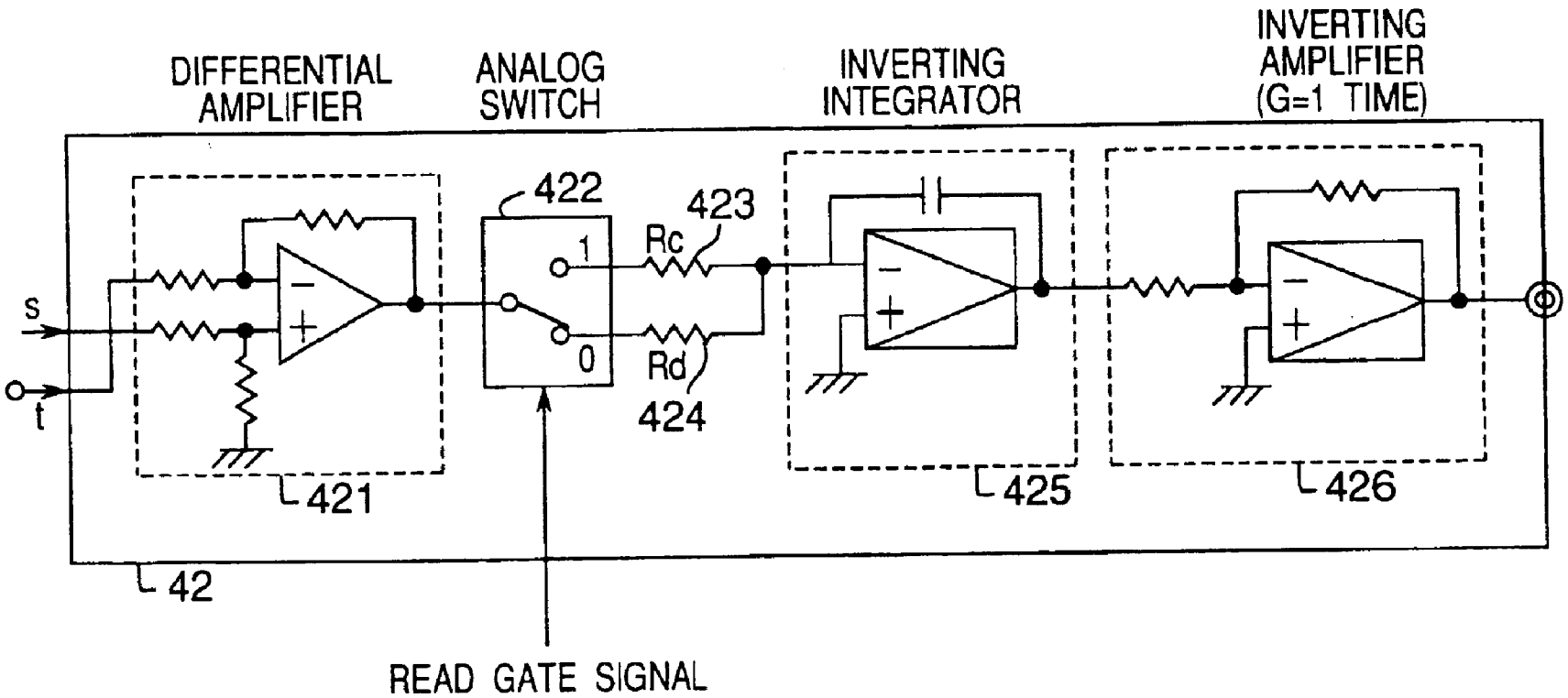
FIG. 8 is a diagram of the detailed configuration of the digital voltage generator shown in FIG. 7.

FIG. 8 shows the configuration of digital voltage generator 42 in detail. Digital voltage generator 42 has a differential amplifier 421, analog switch 422, resistor Rc 423, resistor Rd 424, inverting integrator 425, and inverting amplifier 426. Differential amplifier 421 compares output signals s and t from comparator 41 (FIG. 7), outputs high level (=1) if output signal s is higher, and output low level (=0) if output signal s is lower. Analog switch 422 switches the circuit according to whether the read gate signal is 0 or 1. That is, analog switch 422 closes to resistor Rc 423 when the read gate signal is high level (=1), and closes to resistor Rd 424 when the read gate signal is low level (=0). Note that Rd is here sufficiently low compared with Rc. For example, preferably Rd≈Rc/10. This ensures rapid signal tracking when the read gate signal is low level (=0) because the signal passes the sufficiently low resistor Rd 424. Signals passing resistor Rc 423 or resistor Rd 424 are sequentially input to the series connected inverting integrator 425 and inverting amplifier 426. Inverting integrator 425 and inverting amplifier 426 charge the high level difference between output signals s and t from comparator 41 (FIG. 7) and a specific reference level to the capacitor of inverting integrator 425, and also output the difference.

Figure 9:
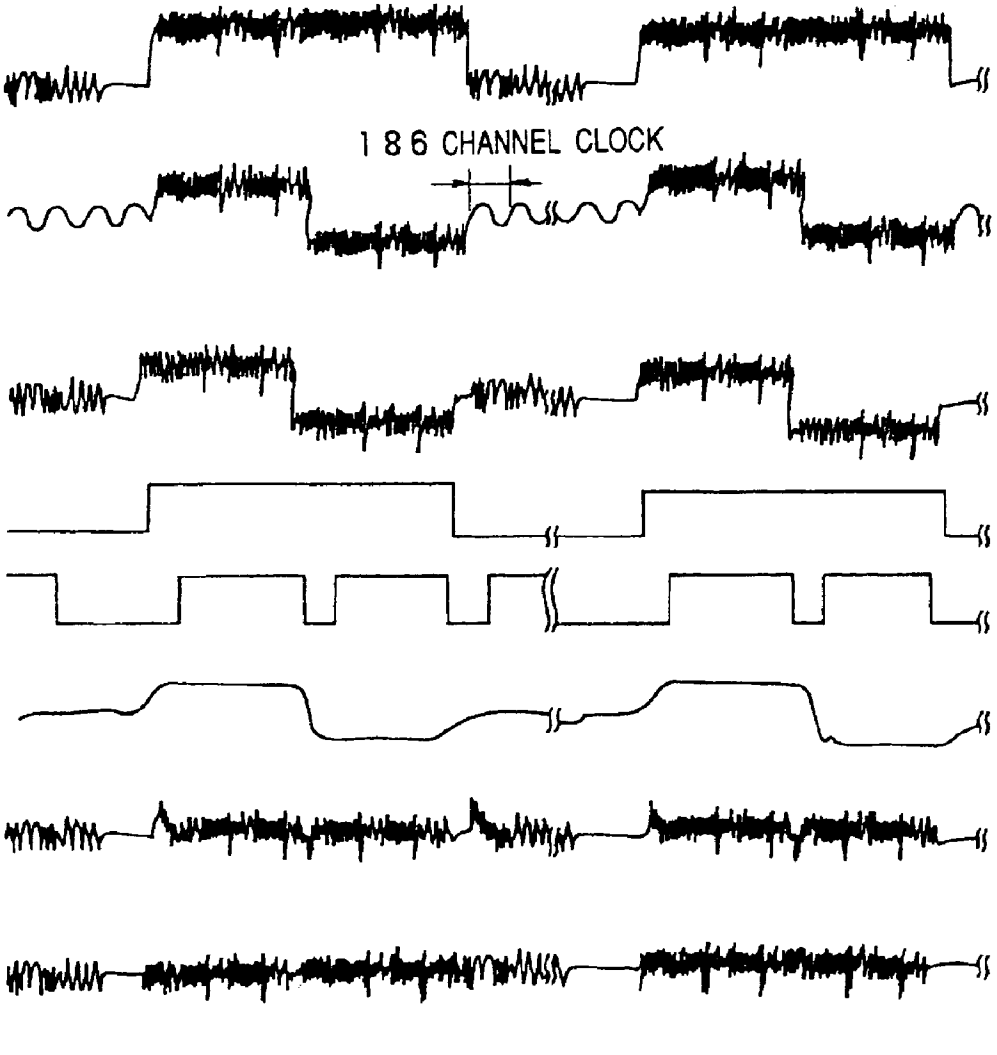
FIG. 9 is a timing chart for describing the operation of the optical disc apparatus shown in FIG. 7.

Operation of optical disc apparatus 700 (FIG. 7) is described next with reference to FIG. 9. FIG. 9 is a timing chart used to describe the operation of optical disc apparatus 700 (FIG. 7). The differences between FIG. 9 and FIG. 3 are due to the above-noted differences (2) and (3) between optical disc apparatus 100 (FIG. 1) and optical disc apparatus 700 (FIG. 7). FIG. 9 additionally shows the waveforms of the output signal ((v) in FIG. 9) from selector 21 (FIG. 7), the output signal ((w) in FIG. 9) from digital voltage generator 42 (FIG. 7), the output signal ((s) in FIG. 9) from comparator 41 (FIG. 7), and the output signal ((x) in FIG. 9) from second differential amplifier 43.

A normal playback operation is described first with reference to FIG. 7. The optical disc 1 read signal captured by optical pickup 2 is first input to preamplifier 3. Preamplifier 3 outputs an RF signal ((a) in FIG. 9) and TE signal ((b) in FIG. 9). Controller 13 applies the header gate signal ((d) in FIG. 9), which goes high level (=1) only in the header area 81 (FIG. 3), to selector 21. Selector 21 selects the TE signal only while the header gate signal is high level (=1), and selects the RF signal when the header gate signal goes low level (=0).

The read gate signal ((e) in FIG. 9) is input to digital voltage generator 42. The read gate signal shown in (e) in FIG. 9 is effectively the same as the read gate signal shown in (e) in FIG. 3 and described in the first embodiment above. That is, this read gate signal ((e) in FIG. 9) rises and falls three times in one sector. In other words, the read gate signal rises slightly delayed from the start of VFO 83a and VFO 85a, falls at the end of address information 84b and address information 86b, rises slightly delayed from the start of VFO 88, and falls in second guard area 90.

Digital voltage generator 42 (FIG. 8) quickly tracks the digital voltage when the read gate signal is low level (=0). The output signal from digital voltage generator 42 (FIG. 8) is shown in (w) in FIG. 9. The next output signal can be obtained using this output signal. More specifically, comparator 41 (FIG. 7) and digital voltage generator 42 (FIGS. 7 and 8) accomplish a process such as follows.

First, the output signal ((v) in FIG. 9) from selector 21 (FIG. 7), and the output signal ((w) in FIG. 9) from digital voltage generator 42 (FIG. 7) are input to comparator 41 (FIG. 7), which detects and outputs the difference (that is, (v)−(w)). This difference signal is shown in (s) in FIG. 9. The inverse of this difference signal is also output. Based on the two supplied signals, digital voltage generator 42 charges the difference above a specific reference level to the capacitor of inverting integrator 425 (FIG. 8), and also outputs this difference. The result is the signal shown in (w) in FIG. 9.

Second differential amplifier 43 subtracts the output signal of digital voltage generator 42 from the output signal of equalizer 6, and outputs the resulting difference signal ((x) in FIG. 9). As will be known from (x) in FIG. 9, the offset between the playback signal from the header area and the playback signal from the user data storage area is cancelled in the output signal of second differential amplifier 43.

Figure 10:
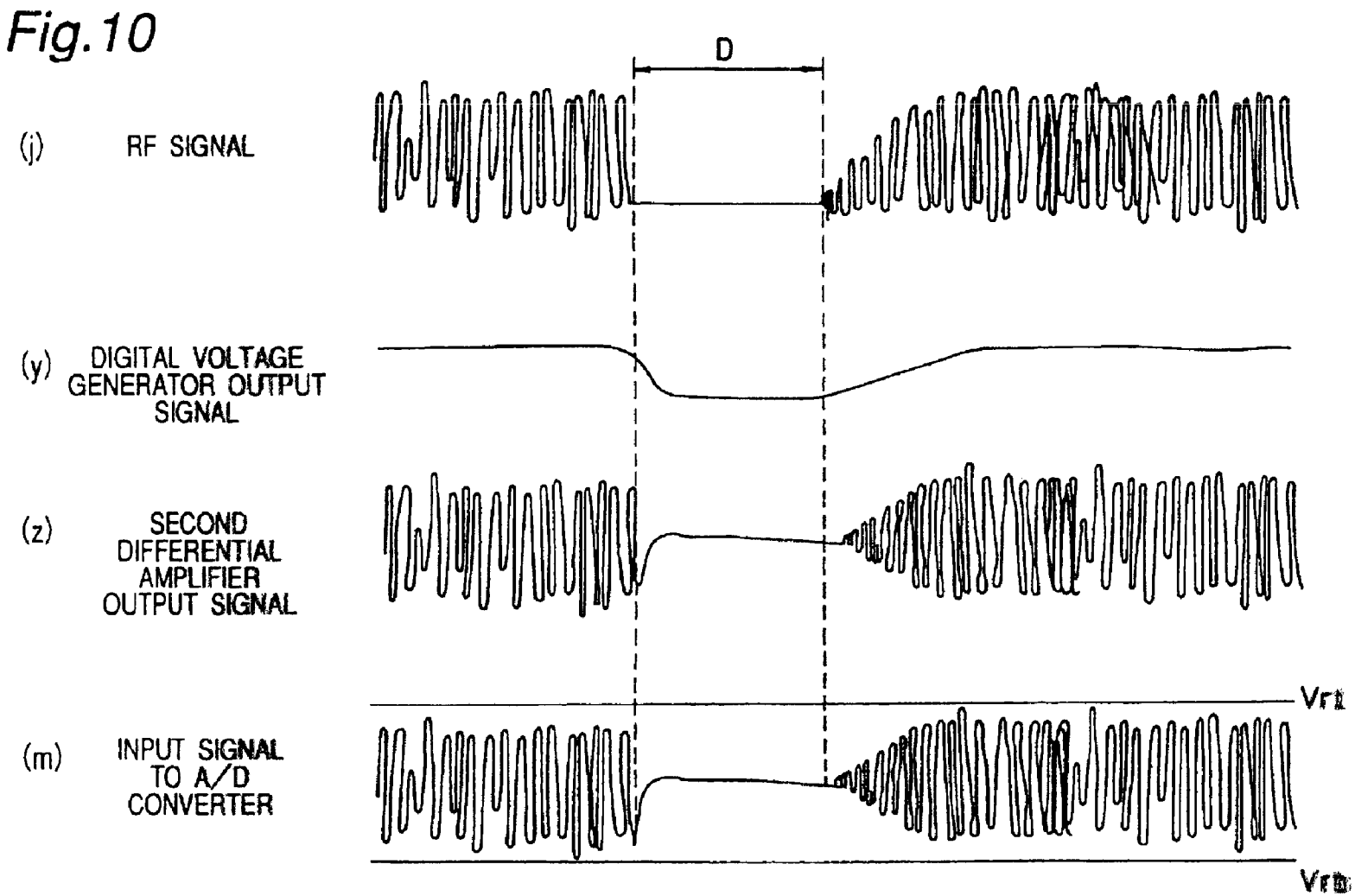
FIG. 10 is a timing chart for describing the operation of primarily the comparator, digital voltage generator, and second differential amplifier.

Operation when reading a sector from a DVD-RAM disc where a black dot is present is described next with reference to FIG. 10. FIG. 10 is a timing chart showing primarily the operation of comparator 41 (FIG. 7), digital voltage generator 42 (FIG. 7), and second differential amplifier 43. Briefly, row (j)) in FIG. 10 shows the RF signal output by preamplifier 3 when a sector where a black dot is present is read. Row (y) shows the output signal from digital voltage generator 42 (FIG. 7), row (z) shows the output signal from second differential amplifier 43 (FIG. 7), and row (u) shows the input signal to A/D converter 8 (FIG. 7).

When the sector of area D where a black dot is present is read, light is not reflected only in the area of the black dot, and the RF signal level therefore goes to the low side (dark reflection side) ((j) in FIG. 10). The duty ratio feedback loop formed by comparator 41 (FIG. 7) and digital voltage generator 42 (FIG. 7) continues to output a digital voltage ((y) in FIG. 10) in such cases to maintain an equal duty ratio of 1s and 0s in the digital signal output by comparator 41 (FIG. 7).

Second differential amplifier 43 (FIG. 7) subtracts the output voltage from digital voltage generator 42 (FIG. 7) from the output signal of equalizer 6 (FIG. 7), and outputs the resulting difference signal ((z) in FIG. 10). As will be known from this output signal, waveform fluctuation after passing the black dot is suppressed. The output signal from second differential amplifier 43 (FIG. 7) is then processed and input to A/D converter 8 (FIG. 7). The input signal ((u) in FIG. 10) to A/D converter 8 (FIG. 7) at this time does not deviate from the reference range of A/D converter 8, and signal reading can therefore resume immediately after passing the black dot.

That is, optical disc apparatus 700 according to this embodiment can absorb DC level differences even when there is always a DC level difference between the playback signal in the header area and the playback signal from the data storage area of the medium, such as occurs with DVD-RAM media. In addition, the playback signal does not exceed the reference range of A/D converter 8 even when a black dot or other imperfection is passed. Optical disc apparatus 700 (FIG. 7) according to this preferred embodiment of the invention can therefore reliably read and reproduce data content, and can thus improve read performance.

It will be obvious to one with ordinary skill in the related art that while these preferred embodiments have been described with reference to operation when a black dot is present, the present invention achieves the same benefits with any fault producing RF waveform fluctuation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc apparatus comprising:

a detection signal generator which detects DC level fluctuation in a playback signal read from an optical disc and generates a detection signal tracking the DC level fluctuation;

a selection unit which selects the detection signal or a null signal without valid polarity based on the detection signal received from the detection signal generator;

a clamping unit which performs a clamping process to suppress DC level fluctuation in the playback signal based on the detection signal when the selection unit selects the detection signal, and which does not perform the clamping process when the selection unit selects the null signal; and a signal processing unit which performs a specific signal process based on clamping unit output.

2. An optical disc apparatus as described in claim 1, further comprising a controller which generates a control signal instructing which signal to select, wherein the selection unit selects a signal based on the control signal generated by the controller.

3. An optical disc apparatus as described in claim 2, wherein the controller again generates a control signal instructing selection of the detection signal when a read error occurs after generating a control signal instructing selection of the null signal a plurality of times.

4. An optical disc apparatus as described in claim 3, wherein the detection signal generator is an amplitude fluctuation sensing unit which detects playback signal amplitude and generates an amplitude fluctuation signal.

5. An optical disc apparatus as described in claim 4, further comprising at least one additional one of the detection signal generator; and an amplitude fluctuation signal delay unit which delays the amplitude fluctuation signal generated by the amplitude fluctuation sensing unit, and generates an extended amplitude fluctuation signal extended by a delay period, wherein the controller generates a control signal instructing selection of the extended amplitude fluctuation signal when a read error occurs after generating a control signal instructing selection of the amplitude fluctuation signal.

6. An optical disc apparatus as described in claim 5 wherein a recording guide groove wobbling at a specific period is formed on the optical disc, the optical disc apparatus further comprising:

a dropout detection unit which detects dropout of a wobble signal corresponding to the guide groove period when reading the optical disc, and generates a dropout detection signal; and a signal delay unit which delays the dropout detection signal generated by the dropout detection unit, and generates an extended dropout detection signal that is extended for a delay period, wherein the controller additionally generates a control signal instructing selection of the dropout detection signal, and generates a control signal instructing selection of the extended dropout detection signal when a read error occurs.

7. An optical disc apparatus for applying a specific signal process to a playback signal read from an optical disc, the optical disc apparatus comprising:

a digitizing unit which digitizes the playback signal and outputs a digital playback signal;

a digital voltage generator which forms a feedback loop with the digitizing unit to output a voltage signal such that a duty ratio of the digitized playback signal from the digitizing unit is a specific value;

a differential amplifier which outputs a differential signal between the playback signal and the voltage signal of the digital voltage generator; and a signal processing unit which performs a specific signal process based on the differential signal from the differential amplifier.

*8. A signal processing circuit used for an optical disc apparatus, said signal processing circuit comprising:*

*a detection signal generator operable to detect DC level fluctuation in a playback signal read from a optical disc, and to generate a detection signal indicating the DC level fluctuation;*

*a selection unit operable to select the detection signal or a null signal without valid polarity based on the detection signal received from the detection signal generator;*

*a unit operable to suppress the DC level fluctuation in the playback signal based on the detection signal when the selection unit selects the detection signal, and not perform the suppression when the selection unit selects the null signal; and*

*a signal processing unit operable to perform a specific signal process based on an output of the unit.*

*9. A signal processing circuit according to claim 8, wherein the detection signal generator is operable to detect the DC level fluctuation in an RF signal, and the unit is operable to suppress the DC level fluctuation in the RF signal based on the detection signal when the selection unit selects the detection signal, and not perform the suppression when the selection unit selects the null signal.*

*10. A signal processing circuit according to claim 8, wherein the detection signal generator is operable to detect the DC level fluctuation in a TE signal, and the unit is operable to suppress the DC level fluctuation in the TE signal based on the detection signal when the selection unit selects the detection signal, and not perform the suppression when the selection unit selects the null signal.*

*11. A signal processing method, comprising:*

*detecting DC level fluctuation in a playback signal read from an optical disc and generating a detection signal indicating the DC level fluctuation;*

*selecting the detection signal or a null signal without valid polarity based on the detection signal;*

*suppressing the DC level fluctuation in the playback signal based on the detection signal when the detection signal is selected, and not performing the suppression when the null signal is selected; and*

*performing a specific signal process based on a result of the suppressing.*

*12. A signal processing method according to claim 11, wherein the playback signal is an RF signal.*

*13. A signal processing method according to claim 11, wherein the playback signal is a TE signal.*

*14. A signal processing circuit according to claim 8, wherein the unit comprises:*

*a bypass filter including:*

*a capacitor;*

*a first resistor;*

*a second resistor; and*

*a switch,*

*the switch being turned to a first position to reduce a time constant of the bypass filter when the selection unit selects the detection signal to suppress the DC level fluctuation.*

* * * * *

UNITED STATES PATENT AND TRADEMARK OFFICE

CERTIFICATE OF CORRECTION

PATENT NO. : RE 39,306 E
APPLICATION NO. : 10/785863
DATED : September 26, 2006
INVENTOR(S) : Shinichi Konishi et al.

It is certified that error appears in the above-identified patent and that said Letters Patent is hereby corrected as shown below:

ON THE FRONT PAGE, ITEM (56)

Under U.S. Patent Documents, please delete "2000/1000083 * 4/2000 Shinichi".

Under Foreign Patent Documents, please add --JP 2000/100083 * 4/2000--.

Signed and Sealed this

Sixth Day of March, 2007

JON W. DUDAS
*Director of the United States Patent and Trademark Office*